(12) United States Patent
Hotton et al.

(10) Patent No.: US 12,031,422 B2
(45) Date of Patent: *Jul. 9, 2024

(54) SYSTEM AND METHOD FOR RECYCLING MISCIBLE NGLs FOR OIL RECOVERY

(71) Applicant: Pioneer Energy, Lakewood, CO (US)

(72) Inventors: Kevin D Hotton, Pagosa Springs, CO (US); Eyal Mordechai Aronoff, Newport Coast, CA (US); Gevorg Noland Sargsyan, Lakewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/134,771

(22) Filed: Apr. 14, 2023

(65) Prior Publication Data
US 2023/0323764 A1   Oct. 12, 2023

Related U.S. Application Data

(63) Continuation of application No. 17/073,286, filed on Oct. 16, 2020, now Pat. No. 11,655,700.

(60) Provisional application No. 62/916,971, filed on Oct. 18, 2019.

(51) Int. Cl.
*E21B 43/40* (2006.01)
*B01D 3/14* (2006.01)
*B01D 3/42* (2006.01)
*C09K 8/592* (2006.01)

(52) U.S. Cl.
CPC .............. *E21B 43/40* (2013.01); *B01D 3/143* (2013.01); *B01D 3/42* (2013.01); *C09K 8/592* (2013.01)

(58) Field of Classification Search
CPC ...... E21B 21/065; E21B 43/168; E21B 43/40; B01D 3/00; B01D 19/00; B01D 3/143
See application file for complete search history.

(56) References Cited

U.S. PATENT DOCUMENTS

2009/0194280 A1* 8/2009 Gil ...................... E21B 43/2406
166/272.2
2017/0248308 A1* 8/2017 Makarychev-Mikhailov ..............
E21B 43/267

* cited by examiner

*Primary Examiner* — Zakiya W Bates
(74) *Attorney, Agent, or Firm* — Joel Douglas

(57) ABSTRACT

A system and method is described to recycle and reuse the gas and NGLs from producing wells thereby increasing on site for oil recovery. The process uses a one-step approach to separate and stabilize the crude from water, NGLs and the natural gas produced during production thereby reducing the complexity associated with oil production surface infrastructure and eliminating a majority of the fugitive emissions.

8 Claims, 1 Drawing Sheet

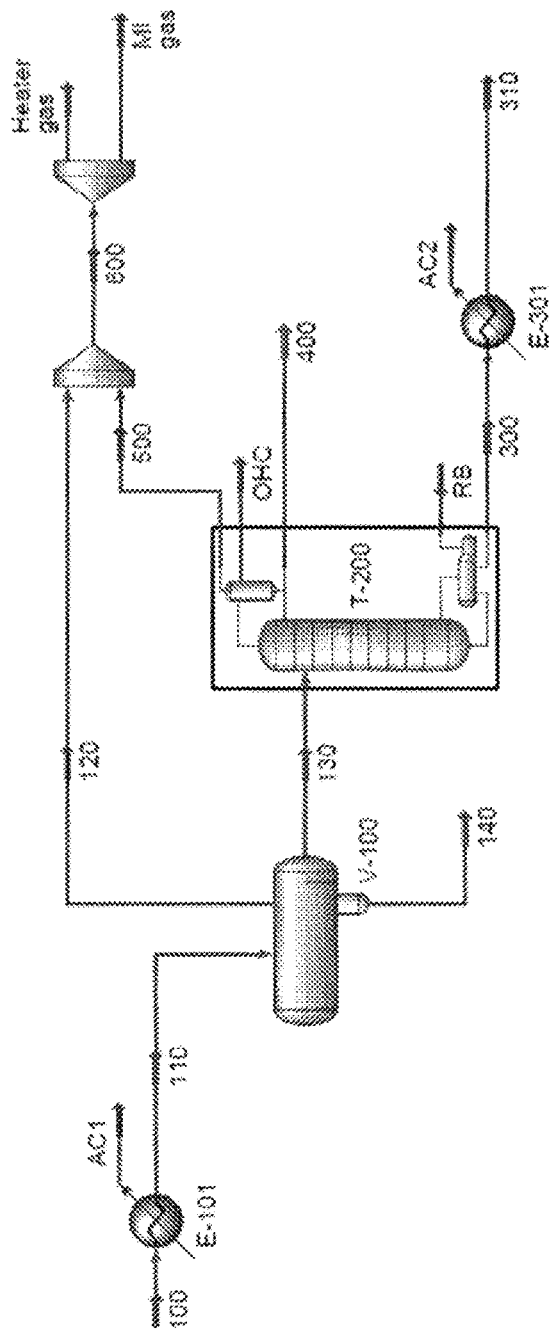

SYSTEM AND METHOD FOR RECYCLING MISCIBLE NGLs FOR OIL RECOVERY

REFERENCE TO RELATED APPLICATIONS

This application is a non-provisional of, and claims the benefit of, U.S. provisional patent application Ser. No. 62/916,971, filed on Oct. 18, 2019 titled "System and Method for Recycling Miscible NGLs for Oil Recovery" and U.S. patent application Ser. No. 17/073,286 filed Oct. 16, 2020 titled "System and Method for Recycling Miscible NGLs for Oil Recovery" which are incorporated in their entirety herein by reference.

BACKGROUND

Crude oil development and production can include up to three distinct phases: primary, secondary, and tertiary (or enhanced) recovery. During primary recovery, the natural pressure of the reservoir or gravity drives oil into the wellbore, combined with artificial lift techniques (such as pumps) which bring the oil to the surface. But only about 10 percent of a reservoir's original oil in place is typically produced during primary recovery. Secondary recovery techniques extend a field's productive life, generally by injecting water or gas to displace oil and drive it to a production wellbore, resulting in the recovery of 20 to 40 percent of the original oil in place.

With much of the easy-to-produce oil already recovered, producers employ tertiary, or enhanced oil recovery (EOR), techniques that offer prospects for ultimately producing 30 to 60 percent, or more, of the reservoir's original oil in place.

Three major categories of EOR have been found to be commercially successful to varying degrees:
a) Thermal recovery, which involves the introduction of heat such as the injection of steam to lower the viscosity, or thin, the heavy viscous oil, and improve its ability to flow through the reservoir.
b) Gas injection, which uses gases such as natural gas, nitrogen, or carbon dioxide (CO2) that expand in a reservoir to push additional oil to a production wellbore, or other gases that dissolve in the oil to lower its viscosity and improve its flow rate.
c) Chemical injection, which can involve the use of long-chained molecules called polymers to increase the effectiveness of waterfloods, or the use of detergent-like surfactants to help lower the surface tension that often prevents oil droplets from moving through a reservoir.

Each of these techniques has been hampered by its relatively high cost and, in some cases, by the unpredictability of its effectiveness.

Shale oil wells that have undergone hydraulic fracturing are known to deplete very rapidly, and end-of-life can be as short as five years. Hundreds of thousands of depleted shale oil wells now exist. In most cases only a small fraction of the existing oil resource has been brought to the surface. With successful application of NGL reinjection technology, more of the oil and gas resource can be captured, increasing the value of existing investments.

An additional use of this invention is to reduce the methane and volatile organic compounds (VOCs) emissions from oil field operations. Current oil field operation separates the gases, the oil, and the produced water by transferring the crude through multiple vessels each at progressively lower pressure. The equipment used to perform these steps are referred to by many names, for example, heater treater, high pressure separator, medium pressure separator, low pressure separator, gas buster, vapor recovery tower, and more. As the crude is transferred from step to step, there are many opportunities for small amounts fugitive methane and volatile organic compounds (VOCs) emissions to escape from the production facility. With the proliferation of production pads brought about by fracking technology, these small fugitive emissions aggregate across each basin, manifesting as impacts on air quality and contributing to climate change. This invention uses a one-step approach to separate the crude from the produced water, the NGLs and the natural gas, reducing the complexity associated with oil production surface infrastructure and eliminating the vast majority of the fugitive emissions associated with current state-of-the-art oil production.

SUMMARY OF THE INVENTION

One embodiment of the invention is a process for natural gas liquids miscible enhanced oil recovery for efficient recovery and reinjection of natural gas liquid injectants, where the fluids being produced from the well are pressure adjusted, the fluids are then cooled, and they are separated into different streams resulting from this said cooling step, yielding waste water, liquid hydrocarbons and gaseous hydrocarbons; and sending the liquid hydrocarbon stream to a fractionation column to output three streams including stabilized crude oil; liquid EOR fluid; and an optional gaseous EOR stream. The later stream is employed for EOR requiring less compression equipment, energy and lower capital input.

Another embodiment of the invention is the same as above, but only the liquid hydrocarbons are used for EOR, and the gaseous stream is used elsewhere. For example, the gaseous stream may be injected into a gathering line of a midstream company; or it may be flared.

Another embodiment of the invention is the same as [0007] above but only the gaseous stream is used for EOR or for maintaining downhole pressure, and the NGLs are used elsewhere. For example, the NGLs may be injected into a gathering line of a midstream company; or trucked to market; or flared.

Another embodiment of the invention is the same as [0007] above, but neither the gaseous hydrocarbons nor the liquid hydrocarbons are injected downhole, rather they are both used elsewhere. For example, they may be injected to the gathering line of a midstream company; trucked to market; or flared.

BRIEF DESCRIPTION OF THE DRAWINGS

FIG. 1 shows a system for enhanced oil recovery.

DESCRIPTION

In different embodiments, a description of highly efficient systems and methods are provided to economically revitalize depleted production sites, including hydraulically fractured shale (or "tight" oil) wells, and potentially increase production from newly fractured wells. In one embodiment there is provided a system that can economically, recycle and reuse both NGLs and dry gas produced during NGL miscible enhanced oil recovery operations.

In various embodiments processes are provided with a system that can recycle and reuse both NGLs and dry gas produced during enhanced oil recovery operations.

Production wells can be subjected to injection of natural gas and/or natural gas liquids (NGLs) for EOR. When the injectants are pumped back out of the well, they carry with them additional crude oil from the ground. This process poses certain challenges, chief among them is the expense of sourcing NGLs at the well pad site. To overcome this challenge an effort is made to recover and reuse the NGLs that are being produced from the injection wells. However, most well pads are subject to a strict contract with their midstream provider that limits what they can do with the gas and NGLs that are produced on site. In particular, the producer is often forbidden from deploying mechanical refrigeration equipment to treat the produced gas on site.

In one embodiment there is provided a system that can economically, and without breaking most existing midstream dedication contracts, recycle and reuse both NGLs and dry gas produced during NGL miscible enhanced oil recovery operations.

In one embodiment of the invention, a means is provided to replace all of the standard well site equipment necessary during the primary and secondary oil production phases with specialized equipment optimized for the EOR tertiary oil recovery phase. A brief list of replaced equipment includes (but is not limited to) heater-treaters, surge (knock-out) vessels, phase separators, vapor recovery towers, vapor recovery compressors, and flares.

Process equipment used in some of the embodiments is described below.

Heater treaters are used in the oil/gas industry to help facilitate oil/water separation by speeding up emulsions separation through the application of heat. Heater treaters can be thought of as low-pressure, three phase separators equipped with fire tubes. They separate gas from the incoming emulsion and separate the emulsion into a water phase and an oil phase.

Surge vessels are used to smooth out pressure surges in both liquid and gas flows.

Phase separators are specialized pressure vessels that are used to separate a mixed inlet flow of liquids and vapors into distinct liquid and vapor output flow streams.

Vapor recovery towers are devices used to collect outgassing vapors from partially stabilized crude oil prior to the oil being stored in tanks.

Vapor recovery compressors are typically used with vapor recovery towers to collect the vapors captured in the tower and compress the gas into gas gathering pipelines. These compressors are unique in their design to handle very low inlet pressures.

Condensate Stabilizers reduce the vapor pressure of produced oil/condensate for stock tank storage and transport, and increase the recoverable quantity of Natural Gas Liquids (NGLs).

One EOR technology among others referred to herein is known as "Huff and Puff" (HaP). This technique requires a minimum of two well bores geographically close together (typically on the same well pad). The HaP technique starts by injecting EOR fluids (light hydrocarbons and/or carbon-dioxide typically in a compressed gaseous or liquid form) down one of the well bores. This injection proceeds for the required time period, for example, for about one month, at which point the well is primed to produce additional oil. The injection of the EOR fluids is now moved to the second well bore. The first pressurized well begins oil production while the second well begins its EOR fluid pressurization phase. Again, after one month, the HaP process is switched, and now the second well is producing oil and the first well is again under EOR pressurization.

In the HaP method when a well is brought back into oil production, not only oil is produced. Much of the injected EOR fluids are returned, and additional produced gas and water is also brought to the surface. In one embodiment a system and process is described to economically recover these valuable EOR fluids for reuse, while also efficiently separating out the produced gas, removing water, and stabilizing the crude oil.

Traditional HaP implementations require purchasing of the NGLs (C2, C3 and C4 hydrocarbons) and trucking them to the wellsite. The NGLs are mixed with gas on site, creating the injectant mix. Large compressors are then used to inject the combined injectant into the well at high pressure (as much as 1,000 PSI or higher typically). In one embodiment, the systems and processes discussed herein strive to minimize the amount of NGLs and gas purchased by recycling and reusing the gas and NGLs being produced by the producing wells on site. Additionally, as much of the EOR fluid as possible will be maintained in the liquid phase, resulting in lower cost pumps being required and thereby minimizing the EOR stream requiring expensive gas compression. By injecting as much as possible of the EOR fluid in the liquid phase, this will greatly reduce the cost and energy consumption of the EOR injection equipment needed.

The vapor pressure of a fluid stream from the process for EOR may range from 2 to 350 psi.

The temperature of the fluid from the present process for EOR may range from −40 C to 300 C The composition of the fluid may range from 1 to 20% methane, 1 to 20% ethane, 1 to 95% propane, liquified petroleum gas mixtures and the like.

In one embodiment, the process steps comprise:
a) Increase the pressure of the produced fluids from the well to the required pressure.
b) Cool the produced fluids being produced by the well. This includes a mixture of the oil, any produced water, produced gas and EOR fluids. In some embodiments, air cooling is a preferred means.
c) Separate the three distinct streams: wastewater, liquid hydrocarbons and gaseous hydrocarbons.
d) Send the liquid hydrocarbon stream to a fractionation column to output three streams: 1. Stabilized crude oil; 2. Liquid EOR fluid; 3. Gaseous EOR stream (this stream may not always exist in cold ambient conditions).

The gaseous streams produced (from both the initial phase separation and from the fractionation column) are combined. A portion of this gas stream can be used for fractionation column heating and/or fuel for power generation.

FIG. 1 describes a configuration of components for the process.

E-101 is an air-cooled partial condenser. It uses electrically driven fans and finned tubing in its construction.

V-100 is a three-phase-separator. This is a pressure vessel made specifically to efficiently separate water and hydrocarbon mixtures into distinct steams.

T-200 is a fractionation column. Its purpose is to stabilize the crude oil and to generate useful liquid (and frequently) gaseous EOR fluid streams.

E-301 is an air-cooled unit to lower the temperature of the heated oil before sending it to either a pipeline or tank battery.

In one embodiment the process conditions are described below. One embodiment involves a system designed to typically not require initial fluid compression to increase pressure. Expected pressure of operation ranges from 50 to 1,200 psig. Temperatures of inlet fluid produced by the well(s) range from 50° F. to 250° F. and ambient site conditions range from −40° F. to 120° F. and altitudes from sea-level to 9000-ft.

Table 1 below lists the composition of an actual well bore production stream and is the input to an example of one embodiment of the system.

In another embodiment, process conditions may span a range to typically not require initial fluid compression to increase pressure. Expected pressure of operation may be in the 200 to 250 psig range and the temperature of the inlet fluid produced by the well(s) is expected in the 130° F. to 180° F. range. Ambient site conditions are from −20° F. to 100° F., with altitudes from sea-level to 7000-ft.

TABLE I

| Component | Mole fraction vapor phase | Mole fraction liquid phase | Mole fraction aqueous phase |
|---|---|---|---|
| Carbon-Dioxide | 0.004830 | 0.000686 | 0.000005 |
| Nitrogen | 0.003057 | 0.000091 | |
| Water | 0.017970 | 0.002447 | 0.999995 |
| Methane | 0.404065 | 0.026787 | |
| Ethane | 0.076970 | 0.018447 | |
| Propane | 0.280361 | 0.173502 | |
| i-Butane | 0.062481 | 0.078843 | |
| n-Butane | 0.135879 | 0.217202 | |
| i-Pentane | 0.002910 | 0.009608 | |
| n-Pentane | 0.003918 | 0.015311 | |
| n-Hexane | 0.002212 | 0.022612 | |
| n-Heptane | 0.005209 | 0.123945 | |
| n-C11 to n-C14 | 0.000134 | 0.095795 | |
| n-C15 to n-C19 | 0.000004 | 0.070777 | |
| n-C20+ | 0.000000 | 0.143948 | |
| Phase fraction | 0.6571 | 0.3264 | 0.0165 |

In one embodiment, process conditions are preferred to accept the pressurized oil/gas mixture coming up the well bore at a designed choked condition of 200-psig.

Example: An example embodiment of the process is described below. FIG. 1 shows the tag names referred to herein.

The process begins at state-point 100. This represents the total gas/liquid flow stream exiting the well bore (as shown in Table 1). It is the combined oil, water, gas, and EOR fluids that come up during the HaP oil production phase. Total molar flow for this stream is 690 kgmole/hr, at 14.8-bar and 65° C. This is equivalent to 13.8 MMscfd.

The inlet flow enters the cooler E-101, an air-cooled (forced convection with fans) partial condenser which cools the mixture to 45° C. The flow exits the cooler at state-point 110 where the phase fractions are now: vapor 0.5418, liquid 0.4334, aqueous 0.0248. The flow enters the three-phase separator V-100, and three streams exit. The three streams are 120 (vapor), 130 (liquid), and 140 (aqueous) stream.

Stream 130, the liquid hydrocarbon mixture with a slight amount of water entrained, then enters the fractionation column; T-200. The column operates at 13.5-bar and has 10-trays with fluid 130 entering at mid-column-height. The column has an overhead condenser (OHC) and at the bottom a reboiler (RB). The outputs of the column are: stabilized crude oil at 300; liquid EOR fluid at 400; and vapor EOR gas at 500. The composition of these output streams are shown in table-2

TABLE 2

| Component | Mole fraction stream 300 | Mole fraction stream 400 | Mole fraction stream 500 |
|---|---|---|---|
| Carbon-Dioxide | | 0.000733 | 0.004740 |
| Nitrogen | | 0.000029 | 0.000831 |
| Water | | 0.000891 | 0.005676 |
| Methane | | 0.018302 | 0.219961 |
| Ethane | 0.000001 | 0.028997 | 0.089849 |
| Propane | 0.000421 | 0.346603 | 0.402364 |
| i-Butane | 0.002827 | 0.156654 | 0.088651 |
| n-Butane | 0.017384 | 0.418787 | 0.182342 |
| i-Pentane | 0.008294 | 0.011787 | 0.002526 |
| n-Pentane | 0.017071 | 0.015467 | 0.002969 |
| n-Hexane | 0.050421 | 0.001157 | 0.000074 |
| n-Heptane | 0.267583 | 0.000590 | 0.000018 |
| n-C11 to n-C14 | 0.196503 | 0.000003 | |
| n-C15 to n-C19 | 0.144874 | | |
| n-C20+ | 0.294622 | | |
| Molar flow kg mole/hr | 110 | 156 | 33 |

The fractionation column pressure (in this example) is set to allow the OHC to be air-cooled without mechanical refrigeration. Adding refrigeration is an option.

The stabilized crude oil (300) exits the column hot at 290° C. and must be cooled before it can be stored and put in a pipeline. The cooling is accomplished at cooler E-301 with a forced-convection air-cooled heat-exchanger used to lower the crude oil temperature to below 50° C. For this example, the recovered crude oil (310) rate is 4,050 barrels/day.

The EOR liquid stream (400) is at approximately 47° C. and can be directly fed to a pump for injection down the well bore.

The gaseous EOR stream (500) will vary in amount with changes in ambient temperature. It is desirable to maximize the amount of liquid EOR fluid and minimize the amount of gaseous EOR fluid, because pumping liquid down-hole requires much less energy and less expensive pumping equipment than compressing gas down-hole (as exit pressure required is high at over 300-bar).

In one embodiment, the overhead cooling system may be supplemented with a refrigeration system to maximize liquid product streams from overhead streams of the fractionation column.

In this example, liquid EOR flow (400) is at 2,400 barrels/day at 45° C. During colder weather, the OHC on the fractionation column can operate at a lower temperature and thereby create a greater fraction of liquid EOR fluid.

Next, the gaseous EOR streams (120 and 500) are combined creating stream (600). About 5% (~19 kgmole/hr) of this gas is utilized for thermal heat for the reboiler and as a fuel source for electric power generation (if grid power is not being used). The final gaseous EOR fluid (MI gas; miscible injecting gas) is pressurized and sent down-hole using a multi-stage reciprocating compressor. Final (MI gas) flow is 7.2 MMscfd (million standard cubic feet per day).

Enhanced performance of the system is accomplished as needed by the addition of mechanical refrigeration. If the example presented above is evaluated with added refrigeration, improved output of the desired liquid EOR fluid results. The mechanical refrigeration is added after the initial air-cooler (ACI) but before state-point (110) and also used in place of the air-cooled overhead condenser on the distillation column (T-200). For this second example the level of cooling is limited to 15° C. (at both mechanically refrigerated locations). The improved results are shown in Table 3.

TABLE 3

| Component | Mole fraction stream 300 | Mole fraction stream 400 | Mole fraction stream 500 |
|---|---|---|---|
| Carbon-Dioxide |  | 0.001080 | 0.007875 |
| Nitrogen |  | 0.000026 | 0.001285 |
| Water |  | 0.000191 | 0.001409 |
| Methane |  | 0.022664 | 0.376322 |
| Ethane |  | 0.043291 | 0.126879 |
| Propane | 0.000306 | 0.412078 | 0.347131 |
| i-Butane | 0.004066 | 0.147200 | 0.050388 |
| n-Butane | 0.031746 | 0.363312 | 0.087778 |
| i-Pentane | 0.017730 | 0.004961 | 0.000497 |
| n-Pentane | 0.032332 | 0.005022 | 0.000433 |
| n-Hexane | 0.051736 | 0.000112 | 0.000002 |
| n-Heptane | 0.259636 | 0.000064 | 0.000001 |
| n-C11 to n-C14 | 0.186206 |  |  |
| n-C15 to n-C19 | 0.137210 |  |  |
| n-C20+ | 0.279032 |  |  |
| Molar flow kg mole/hr | 116.2 | 253 | 44 |

With this enhanced system, the desired "pumpable" EOR liquid is increased from 2,400 Barrels/day to 3,500 Barrels/day. The enhanced system requires additional power and thermal heat, and the amount of heat (600) used (i.e the Heater gas stream) is now about 8% (~24 kgmole/hr). Resulting in a usable miscible injecting gas stream of 5.6 MMscfd.

The number of trays on the fractionating column may be varied to adjust to the desired properties of the oil stream product.

In other embodiments, other combinations of hydrocarbons and chemicals may be used for EOR. The most noted EOR fluid is carbon-dioxide. In one embodiment CO2 is combined with the gaseous EOR stream. In another embodiment, CO2 captured from wellhead equipment operations emissions is utilized for EOR by blending with the liquid or gas EOR streams produced by the system and processes described herein. The major problem with carbon-dioxide (CO2) is availability in the necessary quantities and at an affordable price. NGLs however, are not without cost, and the inventions described herein provide efficient means to recover and reuse the initial NGL fluid in order to improve the economics of NGL miscible enhanced oil recovery.

In another embodiment, the inventions is used to reduce fugitive methane and VOCs emissions from oil field operations. Oil wells produce a mixture of water, oil, gas, and natural gas liquids (NGLs). Natural gas and the NGLs are typically separated from the liquids by using multiple steps of gradual pressure reduction. Each of these steps involves multiple vessels, valves, pipes, etc. The raw gas is produced at several different pressures, requiring complex compression in order to get it to the required pressure for injection into the midstream gathering line. That injection pressure is dependent on the basin and on the gathering system operating pressure, but more often than not several compressors are required for newly producing pads. The last step in the crude collection in most cases is local storage tanks where off gassing can take place. All these steps, the control of flow through them, and the storage facility itself, generate the majority of the fugitive methane and voes emissions seen from oil field operations today. Those emissions contribute significantly more on a per molecule basis to climate change than does carbon dioxide.

In one embodiment there is provided a method for injection of miscible NGL fluids directly at the toe of the horizontal end for clearing out fouling and/or trapped liquids and increase production rate.

Minimizing fugitive methane and voes emissions is accomplished when the invention is used instead of standard oil production surface infrastructure, by eliminating the pressure drop stages and stabilizing the crude in order to eliminate off gassing. Essentially, one integrated piece of equipment is replacing multiple independent pieces of equipment and storage.

What is claimed is:

1. A system for natural gas liquid miscible enhanced oil recovery for efficient recovery and reinjection of natural gas liquid injectants comprising, a cooling system, a first separation system to separate three distinct streams: wastewater, liquid hydrocarbons and gaseous hydrocarbons, a second separation system whereby the liquid hydrocarbon stream is sent to a fractionation column to output a stabilized crude oil stream, an unfractionated Natural Gas Liquids (NGLs) mix with high concentration of methane and ethane in liquid phase as Enhanced Oil Recovery (EOR) fluid stream and an optional gaseous Enhanced Oil Recovery (EOR) stream, and, a well injection system for the EOR stream for enhanced oil recovery.

2. The system according to claim 1 where said cooling system is passive cooling.

3. The system according to claim 1 where the first separation system comprises multiple phase separators that comprises multiple vessels and said multiple phase separators can operate at different pressures, including using a heater treater system.

4. The system according to claim 1 where there is a drop in pressure in the first separation system or between the first separation system and the second separation system.

5. The system according to claim 1 where no separate NGLs and gaseous streams are produced, rather one stream is produced including the constituent components of both streams.

6. The system according to claim 1 where carbon dioxide is co-injected with the EOR fluids.

7. The system according to claim 6 where the carbon dioxide is recovered from the wellhead fluid or sourced externally from sources including directly from the air capture system, combustion sources, fermentation sources, industrial sources, or from a carbon dioxide pipeline.

8. The system according to claim 1 where EOR fluids are injected directly at the toe of the horizontal end for clearing out fouling and/or trapped liquids and increase production rate.

* * * * *